(12) United States Patent
Giles

(10) Patent No.: US 8,248,956 B2
(45) Date of Patent: Aug. 21, 2012

(54) METHOD OR APPARATUS FOR DISTRIBUTING ROUTING INFORMATION IN NETWORKS

(75) Inventor: Vincent Giles, Domne (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 293 days.

(21) Appl. No.: 12/092,101

(22) PCT Filed: Oct. 31, 2005

(86) PCT No.: PCT/EP2005/055673
§ 371 (c)(1),
(2), (4) Date: Sep. 11, 2008

(87) PCT Pub. No.: WO2007/051490
PCT Pub. Date: May 10, 2007

(65) Prior Publication Data
US 2009/0041044 A1 Feb. 12, 2009

(51) Int. Cl.
*H04L 12/26* (2006.01)
*H04L 12/28* (2006.01)
(52) U.S. Cl. .................. 370/248; 370/392; 370/401
(58) Field of Classification Search .................. 370/401, 370/392, 400
See application file for complete search history.

(56) References Cited

U.S. PATENT DOCUMENTS

| 6,473,421 | B1 | 10/2002 | Tappan | |
|---|---|---|---|---|
| 7,154,889 | B1 * | 12/2006 | Rekhter et al. | 370/392 |
| 7,433,320 | B2 * | 10/2008 | Previdi et al. | 370/248 |
| 2002/0184393 | A1 | 12/2002 | Leddy et al. | |
| 2003/0014540 | A1 | 1/2003 | Sultan et al. | |
| 2004/0034702 | A1 * | 2/2004 | He | 709/224 |
| 2004/0098606 | A1 * | 5/2004 | Tan et al. | 713/200 |

* cited by examiner

*Primary Examiner* — Melanie Jagannathan

(57) ABSTRACT

A method and apparatus is disclosed for distributing routing information between nodes in networks in which routing parameters from subnets are carried in the internal gateway protocol for use in routing decisions in an external gateway protocol.

25 Claims, 3 Drawing Sheets

METHOD OR APPARATUS FOR DISTRIBUTING ROUTING INFORMATION IN NETWORKS

FIELD OF INVENTION

The present invention relates to a method or apparatus for distributing routing information between nodes in networks.

BACKGROUND OF THE INVENTION

Routing traffic in large networks is a complex management task. Such networks are commonly made up of multiple autonomous systems (AS). An AS is a group of one or more networks under mutual administration that share the same routing methodology. An AS uses an internal gateway protocol to distribute routing information across the nodes of the network. This routing information is then used by each node to route data packets within the AS. The AS also uses an external gateway protocol to distribute routing information to other ASs to assist in routing data packets outside their originating AS.

Network administrators can control the routing of network traffic based on criteria such as the IP address range of a data packet. These criteria are associated with the data packets at the location where the packet's route originated, and follows the packet along its route as it is propagated within the AS via the interior gateway protocol. The criteria can be used to identify packets so as to route them in accordance with a set of routing rules held in a routing table of a given router. Some examples of criteria used in routing rules include AS-path, BGP (border gateway protocol) community, router interface, IP (internet protocol) address range, length, metric, MPLS (multi protocol label switching) label, route type or tag. In many networks, it is desirable to route network traffic depending on its destination. Two options are commonly used to influence the route propagation for a specific network, the first involves matching the IP address range of a packet against an IP address prefix list and the second involves matching a tag value which holds data identifying the originating subnet of the traffic. However, prefix lists are difficult to maintain if there are many subnets within an AS. Using tags is difficult where multiple subnets are directly connected to a single router and while different tag values can be used for static routes that are redistributed using an IGP, tags work less well with dynamic routes.

SUMMARY OF THE INVENTION

An embodiment provides a method for distributing routing information between nodes in networks, the method comprising the steps of:
a) receiving a routing data packet from a subgroup of nodes in the network, the packet being received at a first router directly connected to the subgroup;
b) assigning a routing parameter to the routing data packet, the routing parameter being dependent on the subnet;
c) propagating the routing data packet with the routing parameter to a second router in accordance with a first routing protocol;
d) receiving the routing data packet at the second router;
e) translating the routing parameter for use in a second routing protocol; and
f) propagating the routing data packet, including the translated routing parameter, in accordance with the second routing protocol.

The first router may be arranged to receive routing data packets from a plurality of subgroups of nodes. The routing parameters may be assigned to routing data packets in dependence on which of the subgroup of nodes the routing data packet originates. The translating step may be carried out in accordance with one or more translation rules defined in a routing table for use by the second router. The translation rules may be dependent on the value of the routing parameter. The subgroup of nodes may be a subnet. The network may be an autonomous system. The first routing protocol may be an internal gateway protocol and the second routing protocol may be an external gateway protocol.

The routing parameter may be set in an interface command from the subgroup of nodes to the first router. The routing parameter value may be carried in a tag in the first routing protocol and as an attribute in the second routing protocol. The first and second router functions may be provided by a single router apparatus.

Another embodiment provides a method for distributing routing information between nodes in networks, the method comprising the steps of:
a) receiving a routing data packet from a subnet in the network, the packet being received at a first router directly connected to the subnet;
b) assigning a routing parameter to the routing data packet, the routing parameter being dependent on the subnet and being arranged for translation by a second router for propagation in accordance with an external gateway protocol; and
c) propagating the routing data packet with said routing parameter to the second router in accordance with an internal gateway protocol.

A further embodiment provides apparatus for distributing routing information between nodes in networks, the apparatus being operable to:
a) receive a routing data packet from a subgroup of nodes in the network, the routing data packet being received at a first router directly connected to the subgroup;
b) assign a routing parameter to the routing data packet, the routing parameter being dependent on the subnet;
c) propagate the routing data packet with the routing parameter to a second router in accordance with a first routing protocol;
d) receive the routing data packet at the second router;
e) translate the routing parameter for use in a second routing protocol; and
f) propagate the routing data packet, including the translated routing parameter, externally to the network in accordance with the second routing protocol.

Another embodiment provides apparatus for distributing routing information between nodes in networks, the apparatus being operable to:
a) receive a routing data packet from a subnet in the network, the routing data packet being received at a first router directly connected to the subnet;
b) assign a routing parameter to the routing data packet, the routing parameter being dependent on the subnet and being arranged for translation by a second router for onward propagation in accordance with an external gateway protocol; and
c) propagate the routing data packet with the routing parameter to the second router in accordance with an internal gateway protocol.

A further embodiment provides apparatus for distributing routing information between nodes in networks, the apparatus comprising:
a) means for receiving a routing data packet from a subnet in the network, the routing data packet being received at a first router directly connected to the subnet;

b) means for assigning a routing parameter to the routing data packet, the routing parameter being dependent on the subnet and being arranged for translation by a second router for onward propagation in accordance with an external gateway protocol; and c) means for propagating the routing data packet with the routing parameter to the second router in accordance with an internal gateway protocol.

Another embodiment provides a router for distributing routing information between a directly connected subnet and a border router, the router being operable to:

a) receive a routing data packet from a subnet in the network, the routing data packet being received at a first router directly connected to the subnet;

b) assign a routing parameter to the routing data packet, the routing parameter being dependent on the subnet and being arranged for translation by a second router for onward propagation in accordance with an external gateway protocol; and c) propagate the routing data packet with the routing parameter to the second router in accordance with an internal gateway protocol.

A further embodiment provides a program or group of programs arranged to enable a programmable device or a group of such devices to carry out a method for distributing routing information between nodes in networks, the method comprising the steps of:

a) receiving a routing data packet from a subgroup of nodes in the network, the routing data packet being received at a first router directly connected to the subgroup;

b) assigning a routing parameter to the routing data packet, the routing parameter being dependent on the subnet;

c) propagating the routing data packet with the routing parameter to a second router in accordance with a first routing protocol;

d) receiving the routing data packet at the second router;

e) translating the routing parameter for use in a second routing protocol; and f) propagating the routing data packet, including the translated routing parameter, externally to the network in accordance with the second routing protocol.

A further embodiment provides a program or group of programs arranged to enable a programmable device or a group of such devices to carry out a method for distributing routing information between nodes in networks, the method comprising the steps of:

a) receiving a routing data packet from a subnet in the network, the routing data packet being received at a first router directly connected to the subnet;

b) assigning a routing parameter to the routing data packet, the routing parameter being dependent on the subnet and being arranged for translation by a second router for onward propagation in accordance with an external gateway protocol; and c) propagating the routing data packet with the routing parameter to the second router in accordance with an internal gateway protocol.

Another embodiment provides a program or group of programs arranged to enable a programmable device or a group of such devices to provide apparatus for distributing routing information between nodes in networks, the apparatus being operable to:

a) receive a routing data packet from a subgroup of nodes in the network, the routing data packet being received at a first router directly connected to the subgroup;

b) assign a routing parameter to the routing data packet, the routing parameter being dependent on the subnet;

c) propagate the routing data packet with the routing parameter to a second router in accordance with a first routing protocol;

d) receive the routing data packet at the second router;

e) translate the routing parameter for use in a second routing protocol; and f) propagate the routing data packet, including the translated routing parameter, externally to the network in accordance with the second routing protocol.

A further embodiment provides a program or group of programs arranged to enable a programmable device or a group of such devices to provide apparatus for distributing routing information between nodes in networks, the apparatus being operable to:

a) receive a routing data packet from a subnet in the network, the routing data packet being received at a first router directly connected to the subnet;

b) assign a routing parameter to the routing data packet, the routing parameter being dependent on the subnet and being arranged for translation by a second router for onward propagation in accordance with an external gateway protocol; and c) propagate the routing data packet with the routing parameter to the second router in accordance with an internal gateway protocol.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS OF THE INVENTION

Figure 1:
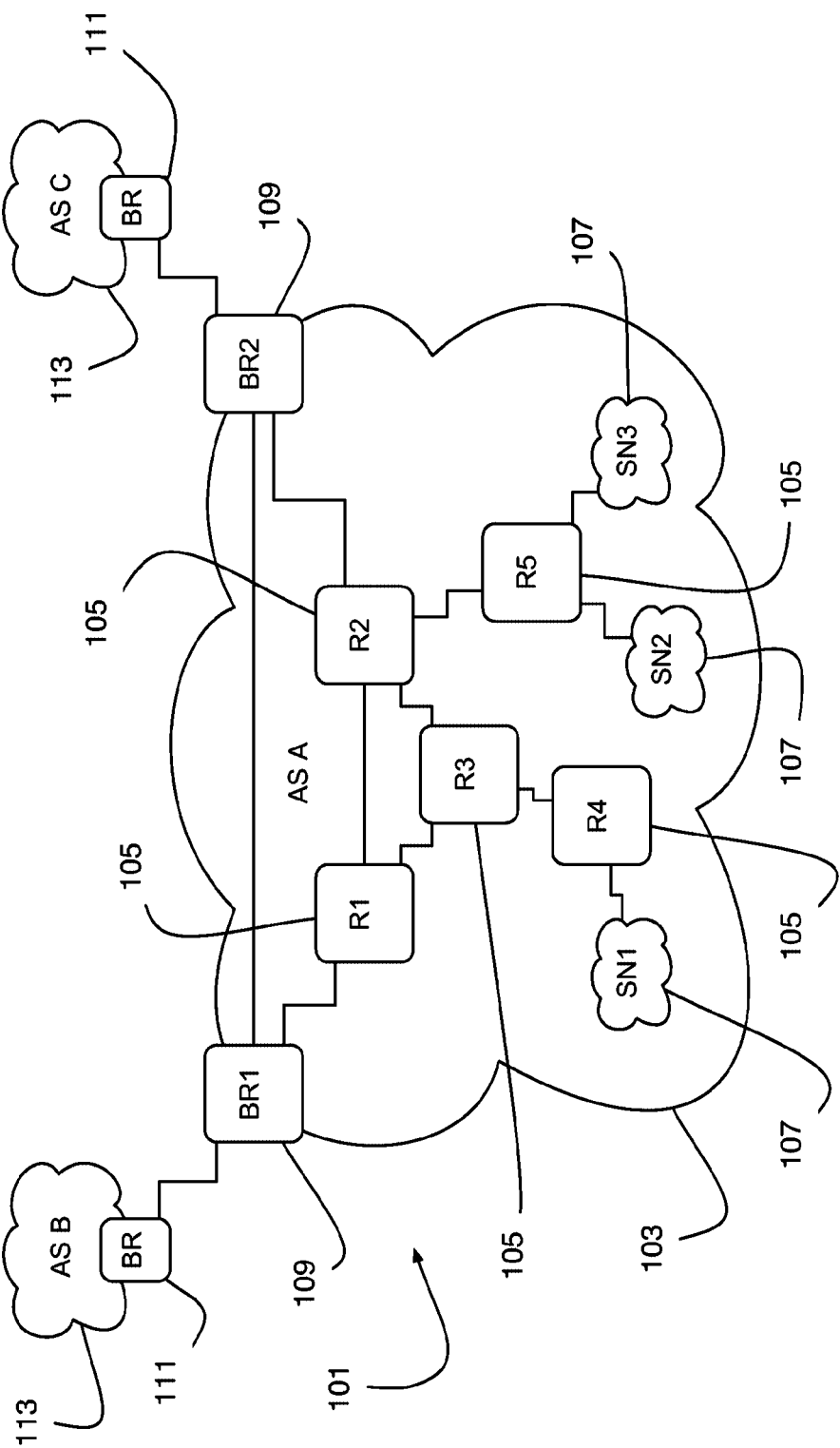
FIG. 1 is a schematic illustration of a network.

With reference to FIG. 1, a network 101 comprises an autonomous system (AS A) 103 comprising of a set of interconnected internal routers (R1, R2, R3, R4, R5) 105, a set of subnets (SN1, SN2, SN3) 107 and two border routers (BR1, BR2) 109. Each subnet 107 is directly connected to one of the internal routers (R4, R5) 105. The internal routers 105 are interconnected with the border routers 109. The border routers 109 are also connected to corresponding border routers 111 providing connections to two further ASs (AS B, AS C) 113.

The border routers 109 are running both external gateway protocol (EGP) processes and internal gateway protocol (IGP) processes in the form of OSPF (Open Shortest Path First) and BGP (Border Gateway Protocol) respectively. The internal routers 105 are running only IGP processes. The IGP and EGP processes handle the distribution of routing information between the routers 105, 109 in the network 101 to enable the routing of data packets across the network 101 in the desired manner. The distribution of routing information is carried using routing data packets.

In the present embodiment, the routers 105, 109 are arranged so that any of the border routers 109 can receive routing information, in the form of an optional routing parameter (ORP), from the subnets 107. The ORP is configured and used only in the routers 105, 109 of the AS (AS A) 103. The ORP is defined in the interface command of each subnet 107 and thus set at the internal router 105 originating routing information from the subnet 107. The ORP is then propagated in a tag value by the IGP of that router to either of the border routers 109. Each border router 109 is equipped with an IGP routing table having rules which can be matched against the ORP values in the tags of incoming routing data packets. These rules provide translations of the ORP in the IGP into an attribute value for the data packet propagated in the EGP.

Each border router 109 is arranged to assign specific EGP attributes to a routing data packet originating from a subnet based on the received ORP value. This translation is carried out as part of the redistribution process of routing information from the IGP to the EGP. The border routers 109 have two rules associated with the ORP value as follows:

Rule 1: If ORP=V1 for subnet SN1, then SN1 has EGP attribute W1.

Rule 2: If ORP=V2 for subnet SN2, then SN2 has EGP attribute W2.

The assigned attributes are used to govern how network traffic will be treated in the ASs through which it is subsequently routed. Identifying traffic as destined for a particular subnet enables it to be routed in a particular manner. Packets or traffic for different subnets can then be routed differently or preferentially. Different subnets may represent different commercial organisations, each using the same external network infrastructure but each with different preferences for how their packet traffic is treated in the network 101. The ORP can be used to carry any value between the router to which a subnet is connected and a border router, so as to influence routing external to the AS to which the subnet is connected. As an example, a border router rule can be arranged to identify an ORP value of 5 from a subnet with the IP address 15.1.1.0 that has been assigned at the internal router to which the subnet is connected. This ORP value can then be translated into the BGP attribute AS-path length with a value of 151 151 151, which is then carried in the routing information advertisement for the subnet. ORP values other than 5 would result in an AS-path length of 151. As another example, a rule could be arranged to respond to an ORP value of 100 from subnet 16.5.0.0 to assign the BGP-community the value 13014:510. The BGP-community value identifies the subnet as being that of a particular organisation. This data can then be used by neighbouring ASs to route traffic to that organisation.

Figure 2:
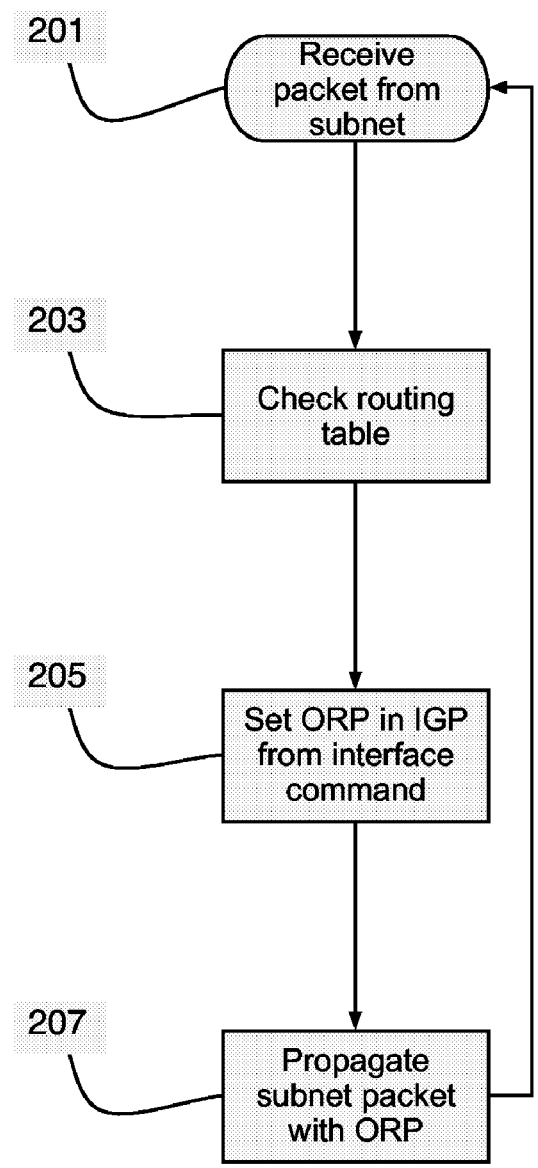
FIGS. 2 and 3 are flow charts illustrating processing carried out by routers in the network of FIG. 1.

The processing of routing data packets carried out by each of the internal routers (R4, R5) from the directly connected subnets 107 will now be described with reference to the flow chart of FIG. 2. At step 201 a routing data packet is received from the subnet which triggers the processing to move to step 203. At step 203, the routing table for the router is inspected to determine how the packet should be distributed. Processing then moves to step 205, where the ORP value defined in the interface command from the subnet is set as an IGP tag value associated with the packet. At step 207, the packet is propagated towards its destination via the IGP and processing returns to step 201 to process the next packet.

Figure 3:
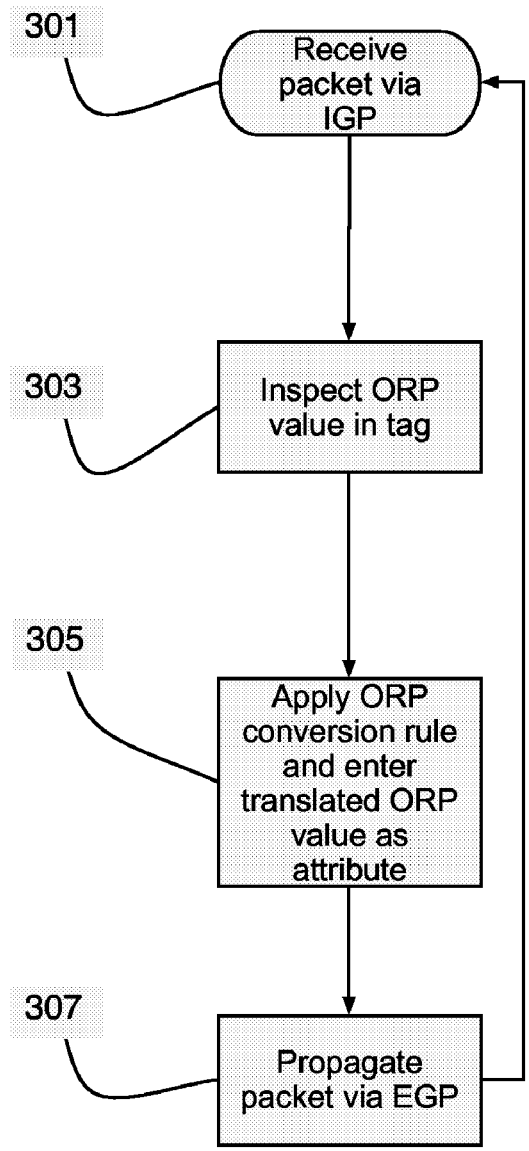

The processing carried out when a routing data packet is received by an appropriate border router 109 will now be described with reference to FIG. 3. A step 301, the border router 109 receives a routing data packet and processing moves to step 303. At step 303, the ORP value of the packet is extracted and processing moves to step 305. At step 305, the conversion rules for the received ORP value are identified and applied, with the translated ORP value being entered as an attribute in the EGP. Processing then moves to step 307 where the packet is propagated to one of the corresponding border routers 111. Once the packet is within one of the other ASs 113, its routing data, including the translated ORP value is used in routing traffic to the originating subnet.

In summary, the tagging of routes on a router where the subnet is connected, injects that tagging information into the IGP running on that router. This tagging information is then carried by the IGP so that the route can be advertised out of the AS with specific EGP attributes. Such attributes then enable special processing to be applied to traffic according to the tag value.

In another embodiment, a command extension is created in the IGP process and used to carry the ORP value. Such a command extension may need a modification to the current standard (RFC) for IGP performance so as to allow propagation of this ORP parameter with the route information.

It will be understood by those skilled in the art that the apparatus that embodies a part or all of the present invention may be a general purpose device having software arranged to provide a part or all of an embodiment of the invention. The device could be single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A method for distributing routing information between nodes in networks, said method comprising the steps of:

a) receiving a routing data packet from a subgroup of nodes in said network, said routing data packet being received at a first router directly connected to said subgroup;

b) assigning, by the first router, a routing parameter to said routing data packet, said routing parameter being dependent on said subgroup;

c) propagating said routing data packet with said routing parameter to a second router in accordance with a first routing protocol;

d) receiving said routing data packet at said second router;

e) translating said routing parameter for use in a second routing protocol; and f) propagating said routing data packet, including said translated routing parameter, externally to said network in accordance with said second routing protocol;

wherein said routing parameter identifies said subnet to which said first router is directly connected;

wherein said first router is directly connected to a plurality of subnets, and wherein said routing parameter identifies a specific one of said subnets but not others of said subnets.

2. A method according to claim 1 in which said first router is arranged to receive routing data packets from a plurality of subgroups of nodes.

3. A method according to dam 2 in which said routing parameters are assigned to routing data packers in dependence on which of said subgroup of nodes said routing data packet originates.

4. A method according to claim 1 in which said translating step is carried out in accordance with one or more translation rules defined in a routing table for use by said second router.

5. A method according to claim 4 in which said translation rules are dependent on the value of said routing parameter.

6. A method according to claim 1 in which said subgroup of nodes is a subnet.

7. A method according to claim 1 in which said network is an autonomous system.

8. A method according to claim 1 in which said first routing protocol is an internal gateway protocol and said second routing protocol is an external gateway protocol.

9. A method according to claim 1 in which said routing parameter is set in an interface command from said subgroup of nodes and introduced into said first routing protocol by said first router.

10. A method according to dam 1 in which said routing parameter value is carried in a tag in said first routing protocol and as an attribute in said second routing protocol.

11. A program or group of programs embodied on a non-transitory computer readable medium, executing on a computer router and arranged to enable a programmable device or a group of such devices to carry out the method of claim 1.

12. A method for distributing routing information between nodes in networks, said method comprising the steps of:
   a) receiving a routing data packet from a subnet in said network, said routing data packet being received at a first router directly connected to said subnet;
   b) assigning, by the first router, a routing parameter to said routing data packet, said routing parameter being dependent on said subnet and being arranged for translation by a second router for onward propagation in accordance with an external gateway protocol; and
   c) propagating said routing data packet with said routing parameter to said second router in accordance with an internal gateway protocol;
   wherein said routing parameter identifies said subnet to which said first router is directly connected;
   wherein said first router is directly connected to a plurality of subnets, and wherein said routing parameter identifies a specific one of said subnets but not others of said subnets.

13. A method according to claim 12, wherein only said first router assigns said routing parameter to said routing data packet.

14. A program or group of programs embodied on a non-transitory computer readable medium, executing on a computer router and arranged to enable a programmable device or a group of such devices to carry out the method of claim 12.

15. Apparatus for distributing routing information between nodes in networks, said apparatus comprising:
   a first router that is directly connected to a subnet in the network and receives a routing data packet from the subnet, assigns a routing parameter to said routing data packet, said routing parameter being dependent on said subnet, and propagates said routing data packet with said routing parameter to a second router in accordance with a first routing protocol, wherein
   the second router is connected to the first router, and receives said routing data packet, translates said routing parameter for use in a second routing protocol, and propagates said routing data packet, including said translated routing parameter externally to said network in accordance with said second routing protocol;
   wherein said routing parameter identifies said subnet to which said first router is directly connected;
   wherein said first router is directly connected to a plurality of subnets, and wherein said routing parameter identifies a specific one of said subnets but not others of said subnets.

16. Apparatus according to claim 15 in which said first router is arranged to receive routing data packets from a plurality of subnets.

17. Apparatus according to claim 16 in which said routing parameters are assigned to routing data packets in dependence on which of said subnet said routing data packet originates.

18. Apparatus according to claim 15 in which said translation is carried out in accordance with one or more translation rules defined in a routing table for use by said second router.

19. Apparatus according to claim 18 in which said translation rules are dependent on the value of said routing parameter.

20. Apparatus according to claim 15 in which said network is an autonomous system.

21. Apparatus according to claim 15 in which said first routing protocol is an internal gateway protocol and said second routing protocol is an external gateway protocol.

22. Apparatus according to claim 15 in which said routing parameter is set in an interface command from said subnet and introduced into said first routing protocol by said first router.

23. Apparatus according to claim 15 in which said routing parameter value is carried in a tag in said first routing protocol and as an attribute in said second routing protocol.

24. A program or group of programs embodied on a non-transitory computer readable medium, executing on a computer router and arranged to enable a programmable device or a group of such devices to operate as the apparatus of claim 15.

25. Apparatus according to claim 15, wherein only said first router assigns said routing parameter to said routing data packet.

* * * * *

UNITED STATES PATENT AND TRADEMARK OFFICE
CERTIFICATE OF CORRECTION

PATENT NO.       : 8,248,956 B2
APPLICATION NO.  : 12/092101
DATED            : August 21, 2012
INVENTOR(S)      : Vincent Giles It is certified that error appears in the above-identified patent and that said Letters Patent is hereby corrected as shown below:

In column 6, line 59, in Claim 3, delete "dam" and insert -- claim --, therefor.

In column 6, line 60, in Claim 3, delete "packers" and insert -- packets --, therefor.

In column 7, line 12, in Claim 10, delete "dam" and insert -- claim --, therefor.

Signed and Sealed this
Fifth Day of February, 2013

Teresa Stanek Rea
*Acting Director of the United States Patent and Trademark Office*